United States Patent
Joo et al.

(10) Patent No.: US 10,109,226 B2
(45) Date of Patent: Oct. 23, 2018

(54) REFLECTIVE DISPLAY DEVICE AND CONTROLLING METHOD THEREOF

(71) Applicant: NanoBrick Co., Ltd., Suwon-si (KR)

(72) Inventors: Jae Hyun Joo, Suwon-si (KR); Dong Jin Lee, Suwon-si (KR); Sa Rang Park, Suwon-si (KR)

(73) Assignee: NANOBRICK CO., LTD., Suwon-si (KR)

( * ) Notice: Subject to any disclaimer, the term of this patent is extended or adjusted under 35 U.S.C. 154(b) by 468 days.

(21) Appl. No.: 14/772,130

(22) PCT Filed: Mar. 13, 2014

(86) PCT No.: PCT/KR2014/002136
§ 371 (c)(1),
(2) Date: Sep. 2, 2015

(87) PCT Pub. No.: WO2014/142589
PCT Pub. Date: Sep. 18, 2014

(65) Prior Publication Data
US 2016/0012762 A1    Jan. 14, 2016

(30) Foreign Application Priority Data
Mar. 13, 2013    (KR) .......................... 10-2013-0026731

(51) Int. Cl.
*G09G 3/20* (2006.01)
*G09G 3/34* (2006.01)
*G02F 1/167* (2006.01)

(52) U.S. Cl.
CPC ........... *G09G 3/2003* (2013.01); *G02F 1/167* (2013.01); *G09G 3/344* (2013.01);
(Continued)

(58) Field of Classification Search
CPC ................. G09G 3/2003; G09G 3/344; G09G 2320/045; G09G 2320/0233;
(Continued)

(56) References Cited

U.S. PATENT DOCUMENTS 7,868,869 B2    1/2011    Shin et al.
8,179,387 B2    5/2012    Shin et al.
(Continued)

FOREIGN PATENT DOCUMENTS

CN    101201524    6/2008
CN    101206371    6/2008
(Continued)

OTHER PUBLICATIONS

International Search Report—PCT/KR2014/002136 dated Jul. 8, 2014.
(Continued)

*Primary Examiner* — Amit Chatly
(74) *Attorney, Agent, or Firm* — Cantor Colburn LLP

(57) ABSTRACT

A reflective display device includes a display part including a fluid having dispersed therein particles having charges, an electric field applying unit including an electrode for applying an electric field to the display part, and a controller for controlling a color of light emitted from the display part, by adjusting at least one of an intensity, polarity, application time, number of applications, and application cycle of a voltage applied to the electric field applying unit, wherein the controller resets an alignment state of the particles by applying a driving voltage for controlling the color of light emitted from the display part, and then applying an alternating-current (AC) voltage having a polarity opposite to that of the driving voltage.

10 Claims, 7 Drawing Sheets

(52) U.S. Cl.
CPC . *G02F 2001/1676* (2013.01); *G09G 2230/00* (2013.01); *G09G 2300/0426* (2013.01); *G09G 2310/0254* (2013.01); *G09G 2310/0256* (2013.01); *G09G 2310/061* (2013.01); *G09G 2310/068* (2013.01); *G09G 2320/0233* (2013.01); *G09G 2320/0257* (2013.01); *G09G 2320/045* (2013.01)

(58) Field of Classification Search
CPC ..... G09G 2310/061; G09G 2310/0254; G09G 2230/00; G09G 2320/0257; G09G 2310/068; G09G 2310/0256; G09G 2300/0426; G02F 1/167; G02F 2001/167
USPC .................................................. 345/107, 108
See application file for complete search history.

(56) References Cited

U.S. PATENT DOCUMENTS

| | | | | |
|---|---|---|---|---|
| 2001/0030639 | A1* | 10/2001 | Goden | G02F 1/167 |
| | | | | 345/107 |
| 2006/0072193 | A1* | 4/2006 | Johnson | G02F 1/167 |
| | | | | 359/430 |
| 2006/0139304 | A1 | 6/2006 | Goden | |
| 2006/0238488 | A1* | 10/2006 | Nihei | G02F 1/167 |
| | | | | 345/107 |
| 2008/0143668 | A1 | 6/2008 | Shin et al. | |
| 2009/0046053 | A1 | 2/2009 | Shigehiro et al. | |
| 2009/0268274 | A1* | 10/2009 | Masuzawa | G02F 1/167 |
| | | | | 359/296 |
| 2010/0149631 | A1 | 6/2010 | Oshika | |
| 2010/0214279 | A1 | 8/2010 | Kim et al. | |
| 2011/0057871 | A1 | 3/2011 | Miyashita | |
| 2012/0007897 | A1 | 1/2012 | Yang et al. | |
| 2012/0188295 | A1 | 7/2012 | Joo | |

FOREIGN PATENT DOCUMENTS

| | | |
|---|---|---|
| CN | 101556767 | 10/2009 |
| KR | 100862666 | 10/2008 |
| KR | 1020090087011 | 8/2009 |
| KR | 20120056246 | 6/2012 |
| KR | 1020120056246 | 6/2012 |

OTHER PUBLICATIONS

European Search Report—European Application No. 14763632.8, dated Sep. 8, 2016, citing US 2008/143668, US 2011/057871, US 2006/139304 and US 2012/007897.

* cited by examiner

REFLECTIVE DISPLAY DEVICE AND CONTROLLING METHOD THEREOF

TECHNICAL FIELD

The present invention relates to a reflective display device and a controlling method thereof and, more particularly, to a reflective display device for resetting an alignment state of particles included in the reflective display device, by applying a driving voltage for controlling a color displayed by the particles, and then applying an alternating-current (AC) voltage having a polarity opposite to that of the driving voltage, or shorting an electrode, and a controlling method thereof.

BACKGROUND ART

Reflective display devices have advantages, such as such as excellent visibility in outdoor environments and superior low-power characteristics, and thus have been widely used in various fields, such as electronic books, mobile displays, outdoor displays.

An electrophoretic display (EPD) technology may be a representative example of reflective display devices. The electrophoretic display (EPD) technology displays information by controlling the position of charged particles using electrophoresis while the charged particles are dispersed in a dielectric material.

According to conventional EPD technologies, if a display device is repeatedly driven, since particles repeatedly move (or operate) in response to an electric field applied thereto and thus unnecessary charges accumulate in the particles, movement characteristics of the particles decrease and display performance (e.g., light transmittance) of the display device is distorted or reduced.

As such, the present inventors invented a reflective display device capable of minimizing reduction in display performance which may occur due to repeated operations, and a controlling method thereof.

DETAILED DESCRIPTION OF THE INVENTION

Technical Problem

The present invention provides a reflective display device for resetting an alignment state of particles included in the reflective display device, by applying a driving voltage for controlling a color of light emitted from the particles, and then applying an alternating-current (AC) voltage having a polarity opposite to that of the driving voltage, or shorting an electrode, and a controlling method thereof.

Technical Solution

According to an aspect of the present invention, there is provided a reflective display device including a display part that includes a fluid in which particles having charges are dispersed; an electric field applying unit that includes an electrode for applying an electric field to the display part; and a controller for controlling a color displayed by the display part, by adjusting at least one of intensity, polarity, application time, number of applications, and period of application of a voltage applied to the electric field applying unit, wherein the controller resets an alignment state of the particles by applying a driving voltage for controlling the color displayed by the display part, and then applying an alternating-current (AC) voltage having a polarity opposite to that of the driving voltage.

According to another aspect of the present invention, there is provided a reflective display device including a display part that includes a fluid in which particles having charges are dispersed; an electric field applying unit that includes an electrode for applying an electric field to the display part; and a controller for controlling a color displayed by the display part, by adjusting at least one of intensity, polarity, application time, number of applications, and period of application of a voltage applied to the electric field applying unit, wherein the controller resets an alignment state of the particles by applying a driving voltage for controlling the color displayed by the display part, and then shorting the electrode.

According to another aspect of the present invention, there is provided a reflective display device including a display part that includes a fluid in which particles having charges are dispersed; an electric field applying unit that includes an electrode for applying an electric field to the display part; and a controller for controlling a color displayed by the display part, by adjusting at least one of intensity, polarity, application time, number of applications, and period of application of a voltage applied to the electric field applying unit, wherein the controller resets an alignment state of the particles by applying a driving voltage for controlling the color displayed by the display part, shorting the electrode, and then applying an alternating-current (AC) voltage having a polarity opposite to that of the driving voltage.

The controller may apply a first driving voltage, short the electrode, apply an AC voltage having a polarity opposite to that of the first driving voltage, short the electrode again, and then apply a second driving voltage.

An insulation material may be provided on at least a partial region of a surface of the electrode.

The electrode may include a first electrode and a second electrode that are provided in a complementary manner on an upper substrate or a lower substrate.

The electrode may include a first electrode and a second electrode provided in a complementary manner on an upper substrate, and a third electrode provided on a lower substrate facing the upper substrate, a reset voltage may be applied between the first electrode and the second electrode, and the driving voltage may be applied between the first electrode and the third electrode or between the second electrode and the third electrode.

The driving voltage may be a pulse-type voltage.

The fluid may include an additive capable of improving a degree of dispersion of the particles.

According to another aspect of the present invention, there is provided a controlling method of a reflective display device, the method including applying an electric field to a display part that includes a fluid in which particles having charges are dispersed; and controlling a color displayed by the display part, by adjusting at least one of intensity, polarity, application time, number of applications, and period of application of a voltage applied to an electrode for applying the electric field, wherein an alignment state of the particles is reset by applying a driving voltage for controlling the color displayed by the display part, and then applying an alternating-current (AC) voltage having a polarity opposite to that of the driving voltage.

According to another aspect of the present invention, there is provided a controlling method of a reflective display device, the method including applying an electric field to a display part that includes a fluid in which particles having charges are dispersed; and controlling a color displayed by the display part, by adjusting at least one of intensity, polarity, application time, number of applications, and period of application of a voltage applied to an electrode for applying the electric field, wherein an alignment state of the particles is reset by applying a driving voltage for controlling the color displayed by the display part, and then shorting the electrode.

According to another aspect of the present invention, there is provided a controlling method of a reflective display device, the method including applying an electric field to a display part that includes a fluid in which particles having charges are dispersed; and controlling a color displayed by the display part, by adjusting at least one of intensity, polarity, application time, number of applications, and period of application of a voltage applied to an electrode for applying the electric field, wherein an alignment state of the particles is reset by applying a driving voltage for controlling the color displayed by the display part, shorting the electrode, and then applying an alternating-current (AC) voltage having a polarity opposite to that of the driving voltage.

Advantageous Effects

According to the present invention, degradation due to repeated operation of a reflective display device, i.e., reduction in display performance, may be minimized.

EXPLANATION OF REFERENCE NUMERALS

Figure 1:
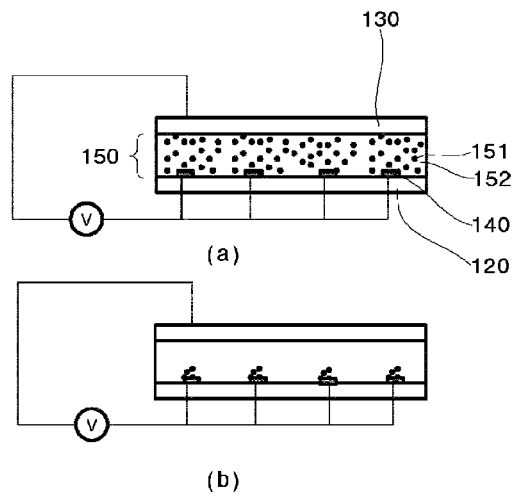
FIG. 1 illustrates the configuration of a reflective display device according to an embodiment of the present invention.

100: Reflective display device
110: Upper substrate
120: Lower substrate
130: Upper electrode
140: Lower electrode
150: Display part
151: Particles
152: Fluid
160: Third electrode
170: First electrode
180: Second electrode
190: Insulating material

MODE OF THE INVENTION

The detailed description of the present invention illustrates specific embodiments in which the present invention can be performed with reference to the attached drawings. In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Hereinafter, the present invention will be described in detail by explaining embodiments of the invention with reference to the attached drawings to enable one of ordinary skill in the art to easily carry out the invention.

[Configuration of Reflective Display Device]

FIG. 1 illustrates the configuration of a reflective display device according to an embodiment of the present invention.

Referring to FIG. 1, the reflective display device 100 according to an embodiment of the present invention may include an upper substrate 110, a lower substrate 120, an upper electrode 130, a lower electrode 140, and a controller (not shown) for controlling an electric field applied through the upper and lower electrodes 130 and 140. The reflective display device 100 according to an embodiment of the present invention may further include a display part 150 between the upper and lower electrodes 130 and 140, and the display part 150 may include particles 151 having charges of the same polarity and dispersed in a fluid 152.

More particularly, according to an embodiment of the present invention, the upper substrate 110, the lower substrate 120, the upper electrode 130, and the lower electrode 140 may be comprised of light-transmissive materials, and one of the upper and lower electrodes 130 and 140 may be patterned to cover only a partial region of the upper substrate 110 or lower substrate 120. Accordingly, when an electric field is applied through the upper and lower electrodes 130 and 140, the particles 151 may move toward the patterned lower electrode 140 and thus the light transmittance of the reflective display device 100 may be adjusted. That is, according to an embodiment of the present invention, when no voltage is applied to the upper and lower electrodes 130 and 140, the particles 151 may be dispersed freely in the fluid 152 (see (a) of FIG. 1) and thus external light may be blocked ("OFF" mode). When a voltage having a polarity opposite to the charges of the particles 151 is applied to the upper and lower electrodes 130 and 140, the particles 151 may be concentrated near the patterned lower electrode 140 (see (b) of FIG. 1) and thus external light may be transmitted ("ON" mode) through a region other than the region in which the particles 151 are concentrated.

Figure 3:
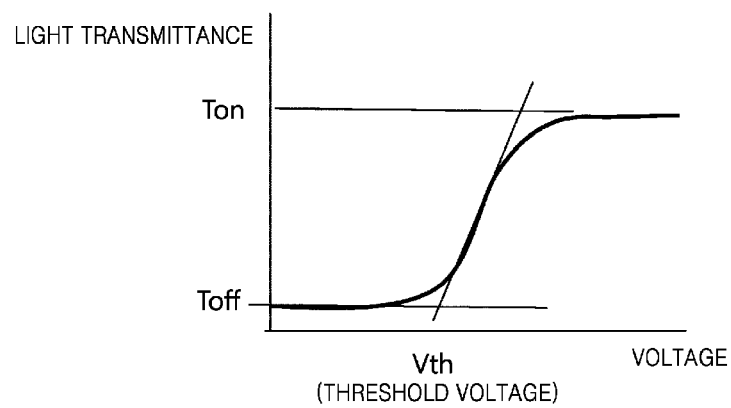
FIG. 3 illustrates variation in light transmittance in response to voltages applied to electrodes, according to an embodiment of the present invention.

FIG. 3 illustrates variation in light transmittance in response to voltages applied to electrodes, according to an embodiment of the present invention.

Referring to FIG. 3, the particles 151 included in the reflective display device 100 may have a minimum voltage for electrophoresis, i.e., a threshold voltage Vth. According to an embodiment of the present invention, to achieve the threshold voltage Vth of the particles 151, a material may be included in the fluid 152 in which the particles 151 are dispersed and at least one of permittivity, electric polarization, and viscosity of the material may vary in response to an electric field applied to the fluid 152.

Meanwhile, according to an embodiment of the present invention, the fluid 152 in which the particles 151 are dispersed may comprise an insulation material whose electrical conductivity is equal to or smaller than a predetermined value.

According to an embodiment of the present invention, the flow of current between the upper and lower electrodes 130 and 140 may be prevented by providing an insulating layer on the upper or lower electrode 130 or 140.

According to an embodiment of the present invention, an absolute value of a zeta potential of the particles 151 dispersed in the fluid 152 may be equal to or greater than 20 mV.

According to an embodiment of the present invention, a repulsive force among the particles 151 due to a steric effect may be increased by coating a polymeric material on the surfaces of the particles 151 dispersed in the fluid 152.

According to an embodiment of the present invention, the size of the particles 151 may be equal to or greater than 10 nm but not greater than 200 nm.

According to an embodiment of the present invention, the particles 151 may be black particles that include carbon or white particles that include titanium oxide (TiOx).

According to an embodiment of the present invention, the particles 151 or the fluid 152 may have a unique color in itself.

According to an embodiment of the present invention, the upper or lower electrode 130 or 140 may comprise a transparent conductive film including at least one of indium (In), silver (Ag), graphene, and carbon, or comprise a material including chromium (Cr), silver (Ag), aluminum (Al), or the like.

According to an embodiment of the present invention, the upper and lower substrates 110 and 120 may comprise glass, plastic, or the like.

Figure 2:
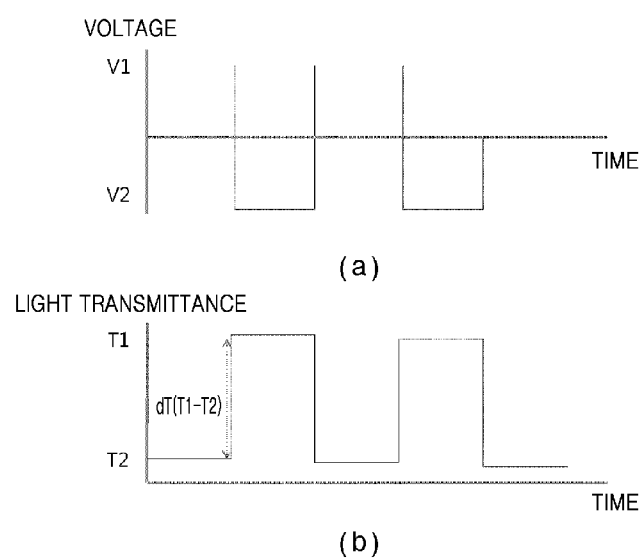
FIG. 2 illustrates the pattern of voltages that are applied to electrodes in order to apply an electric field to a display part, and a light transmittance based on the pattern of the voltages, according to an embodiment of the present invention.

FIG. 2 illustrates the pattern of voltages that are applied to electrodes in order to apply an electric field to a display part, and a light transmittance based on the pattern of the voltages, according to an embodiment of the present invention.

Referring to FIG. 2, when continuous display is implemented by sequentially applying driving voltages having different intensities and different polarities to the particles 151 and the fluid 152, the controller of the reflective display device 100 according to an embodiment of the present invention may reset the distance between the particles 151 in between applying the different driving voltages. Specifically, when a first driving voltage and a second driving voltage are sequentially applied to the upper and lower electrodes 130 and 140 for applying an electric field to the particles 151 and the fluid 152, the controller according to an embodiment of the present invention may apply a reset voltage having a polarity opposite to that of the first driving voltage to the particles 151 and the fluid 152 after the first driving voltage is applied and before the second driving voltage is applied, thereby moving the particles 151 that have moved due to the first driving voltage, back to an initial state. As such, the reflective display device 100 according to an embodiment of the present invention may improve display performance, by suppressing a residual image.

However, since the upper and lower electrodes 130 and 140 of the reflective display device 100 have different sizes and shapes, charges accumulate in the display part 150 as the reflective display device 100 is repeatedly operated. Due to these accumulated charges, even when the same voltage is applied to the upper and lower electrodes 130 and 140, an effective voltage that is actually applied to the particles 151 may vary. That is, as the reflective display device 100 is repeatedly driven (i.e., repeatedly operates), a variation dT in light transmittance (=T1 (light transmittance in a transparent state)−T2 (light transmittance in a light-blocking state)) may be gradually reduced and thus degradation may occur.

[Configuration for Improving Transmittance Characteristics]

According to an embodiment of the present invention, one of or a combination of two or more of the methods described below may be used to minimize degradation due to repeated operation.

Figure 4:
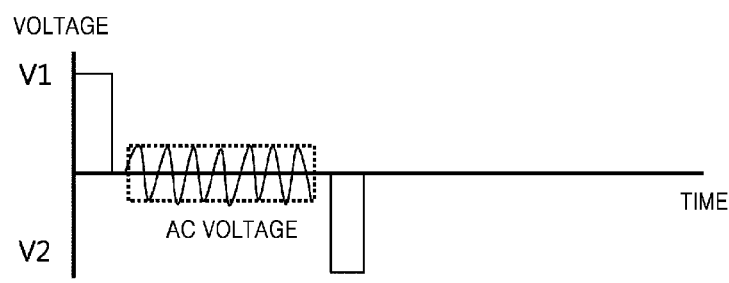
FIGS. 4 to 9 illustrate configurations for minimizing deterioration of a reflective display device, according to embodiments of the present invention.

(1) As illustrated in FIG. 4, according to an embodiment of the present invention, an alternating-current (AC) voltage may be applied in between applying driving voltages such that a degree of dispersion of the concentrated particles 151 is locally improved (i.e., the concentrated particles 151 are scattered), thereby maximizing a spreading effect of the particles 151. That is, an AC voltage equal to or smaller than a predetermined intensity may be applied primarily to locally vibrate the particles 151 and form an easily spreadable state, and then a voltage for light-blocking (OFF) mode may be applied to spread the particles 151.

Figure 5:
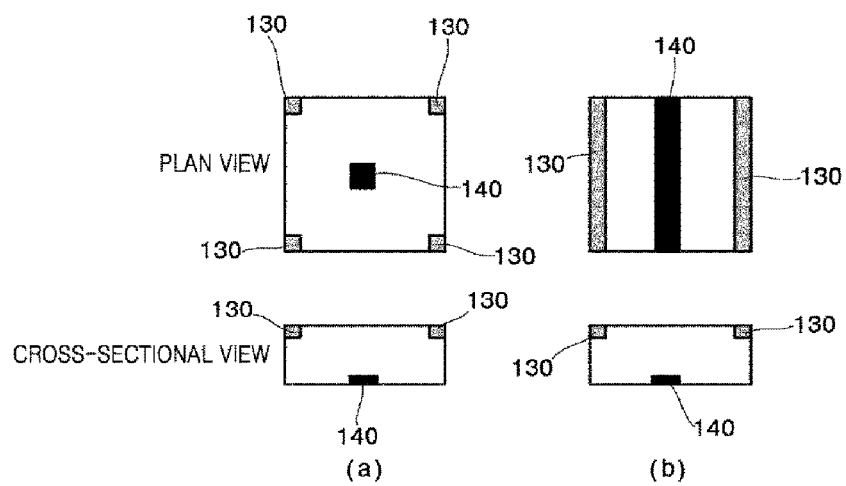

(2) As illustrated in FIG. 5, according to an embodiment of the present invention, both the upper and lower electrodes 130 and 140 may be patterned and thus the particles 151 concentrated near the pattern of the lower electrode 140 may be more effectively spread by an electric field applied through the pattern of the upper electrode 130. The pattern of the upper electrode 130 and the pattern of the lower electrode 140 according to the present invention may be provided in the form of dots, lines, or the like. However, the patterns of the upper and lower electrodes 130 and 140 are not limited thereto but may vary within the scope of the present invention.

Figure 6:
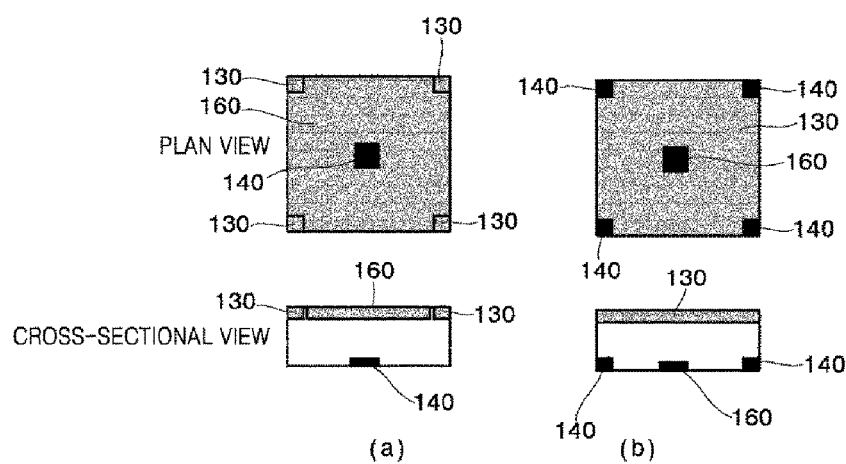

(3) As illustrated in FIG. 6, according to an embodiment of the present invention, with a third electrode 160 on the upper substrate 110 or lower substrate 120, a voltage may be primarily applied between the third electrode 160 and one of the upper and lower electrodes 130 and 140, which is on the same substrate as the third electrode 160, to initially spread the particles 151, and then a voltage may be secondarily applied between the upper electrode 130 and lower electrode 140 to further spread the particles 151. Here, an AC voltage may be primarily applied, and a direct-current (DC) voltage may be secondarily applied.

Figure 7:
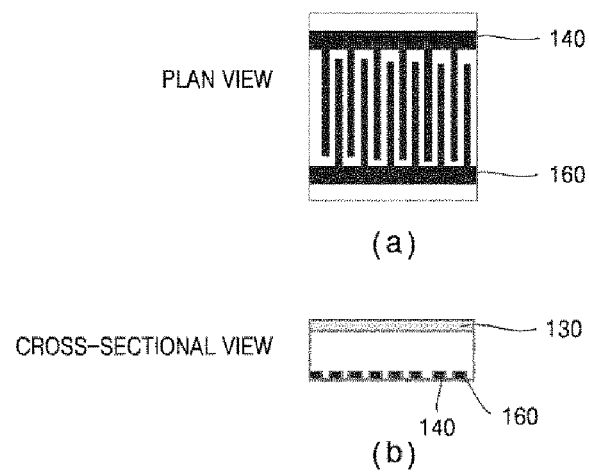

(4) As illustrated in FIG. 7, according to an embodiment of the present invention, with the lower electrode 140 and the third electrode 160 in a complementary manner on the lower substrate 120 and the upper electrode 130 on the upper substrate 110, an AC voltage may be applied between the lower electrode 140 and the third electrode 160 such that the particles 151 concentrated near the lower electrode 140 and the third electrode 160 are primarily spread, and then an opposite-polarity voltage for light-blocking (e.g., OFF) mode may be applied to the upper, lower, and third electrodes 130, 140, and 160 such that the particles 151 are secondarily spread. Here, the primary spreading and the secondary spreading may be performed in the opposite order.

Figure 8:
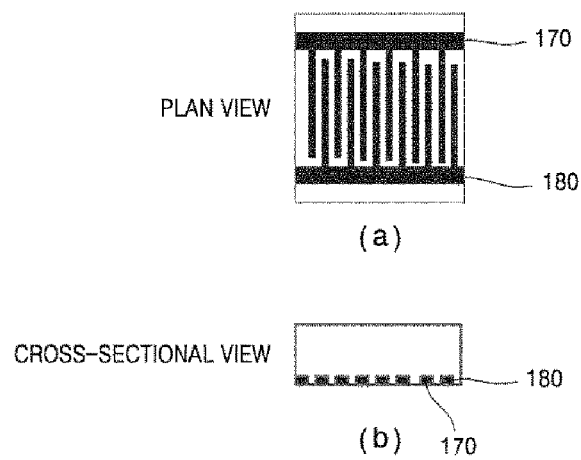

(5) As illustrated in FIG. 8, according to an embodiment of the present invention, with no electrode on the upper substrate 110 that is light transmissive and with light-transmissive first and second electrodes 170 and 180 on the lower substrate 120, a voltage may be applied between the first electrode 170 and second electrode 180 such that the particles 151 are concentrated in a region 1701 near the first electrode 170, and an opposite-polarity voltage or an AC voltage may be applied between the first electrode 170 and second electrode 180 to spread the particles 151.

Figure 9:
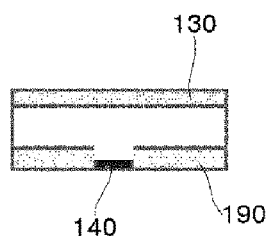

(6) As illustrated in FIG. 9, according to an embodiment of the present invention, by covering side surfaces of the upper and lower electrodes 130 and 140 with an insulation material 190 or by providing a space only on top surfaces of the upper and lower electrodes 130 and 140, in which the particles 151 are concentrated, the particles 151 may be prevented from being concentrated near the side surfaces of the upper and lower electrodes 130 and 140 and thus a reduction in light transmittance may be prevented.

(7) According to an embodiment of the present invention, in order to effectively remove charges that have accumulated in the display part 150 due to a previously-applied driving voltage, before applying a new driving voltage between the upper and lower electrodes 130 and 140, the charges may be reset to a predetermined value before the new driving voltage is applied. Particularly, the upper and lower electrodes 130 and 140 may be electrically shorted and discharged before the new driving voltage is applied. Furthermore, according to an embodiment of the present invention, the upper and lower electrodes 130 and 140 may be grounded and thus discharged before the new driving voltage is applied.

(8) According to an embodiment of the present invention, a capacitor (not shown) having a predetermined capacity may be additionally mounted on the upper or lower electrode 130 or 140 to prevent or minimize the accumulation of charges in the display part 150 due to repeated operation. Specifically, according to an embodiment of the present invention, the capacitor may be connected to the upper electrode 130 which is light-transmissive. Here, the capacity of the capacitor may be set to a value that is proportional to the ratio of the area of the upper electrode 130 to the area of the lower electrode 140.

(9) According to an embodiment of the present invention, even in a light-transmitting mode (ON) in which the particles 151 are concentrated near an electrode or in a light-blocking mode (OFF) in which the particles 151 are irregularly dispersed, an AC voltage equal to or smaller than a predetermined intensity may be applied periodically or the intensity of a driving voltage may be changed periodically in a range in which the light transmittance remains unchanged, thereby effectively preventing the concentration of the particles 151 while the reflective display device 100 operates.

(10) According to an embodiment of the present invention, by applying a pulse-type driving voltage, the time required for applying a driving voltage to maintain a light-transmitting mode (ON) or light-blocking mode (OFF) may be minimized, and thus degradation or dielectric break down, which may occur when a driving voltage is applied continuously, can be minimized.

(11) According to an embodiment of the present invention, an additive may be added into the fluid 152 in the display part 150. Particularly, as the amount of the additive (e.g., a surfactant or a charge provider) added into the fluid 152 increases, the charging effect or a degree of dispersion of the particles 151 may increase. However, too much amount of the additives may cause the additives to stick together in the form micelles or reverse micelles such that a plurality of particles may function like as a single particle. The micelles formed by the additives moves slowly and thus may adversely affect the normal operation of an element having a variable light transmittance. Therefore, according to an embodiment of the present invention, the amount of the additives to be added into the fluid may be determined in consideration of a density of the additives capable of increasing the charging effect and the degree of dispersion of the particles, as well as a density of the additives causing the additives to stick together.

Particularly, according to an embodiment of the present invention, by surface-processing the particles 151 before the additive is added, the additive may be effectively adsorbed onto the surfaces of the particles 151 and thus the additive may not remain in the fluid 152. In addition, if the additives have a high molecular weight, the degree of dispersion of the particles 151 may increase due to a steric effect but the additives may stick together. As such, according to an embodiment of the present invention, the density of the additive may be determined in consideration of the steric effect as well as the prevention of aggregation. Furthermore, according to an embodiment of the present invention, after the additive added into the fluid 152 in the display part 150 produces the charging effect on the particles 151, the excessive amount of the additives remaining in the fluid 152 may be removed or reduced by adding into the fluid 152 a material capable of adsorbing the additives, or using a method such as a fluid substitution.

(12) According to an embodiment of the present invention, an insulation film comprising silicon oxide (SiOx), silicon nitride (SiNx), or the like may be formed on the surfaces of the upper and lower electrodes 130 and 140 to prevent the charge transfer between the particles 151 and the upper and lower electrodes 130 and 140 and the adsorption of charges onto the particles 151 and the upper and lower electrodes 130 and 140.

Application of the Present Invention

According to an embodiment of the present invention, a reflective display device according to the present invention may be applied using at least one of methods described below, or a combination thereof.

(1) According to an embodiment of the present invention, a reflective display device according to the present invention may be used in combination with emissive display devices (e.g., organic light-emitting diode (OLED) display devices, liquid-crystal display (LCD) devices, light-emitting diode (LED) display devices, or plasma display panel (PDP) display devices) or other reflective display devices (e.g., electrowetting display (EWD) devices).

(2) According to an embodiment of the present invention, each part of the electrode of the reflective display device according to the present invention may be driven independently and thus light transmittances thereof may be adjusted independently.

(3) According to an embodiment of the present invention, a color filter, a color reflector, a color OLED, or a total reflection plate (mirror) may be located on an upper electrode or a lower electrode of a reflective display device according to the present invention and thus a mixed display device may be provided.

(4) According to an embodiment of the present invention, a reflective display device according to the present invention may be used in combination with a touch-screen device or a touch sensor.

(5) According to an embodiment of the present invention, a reflective display device according to the present invention may be combined with a variety of sensors (a temperature sensor, a light sensor, etc.) and thus a light transmittance may be adjusted automatically in response to a result of sensing.

Experimental Results

FIGS. 10 to 13 illustrate various patterns of voltages applied to electrodes in experiments, according to embodiments of the present invention. FIG. 14 illustrates the change in light transmittance of a reflective display device as the reflective display device is repeatedly driven in experiments, according to embodiments of the present invention.

Figure 10:
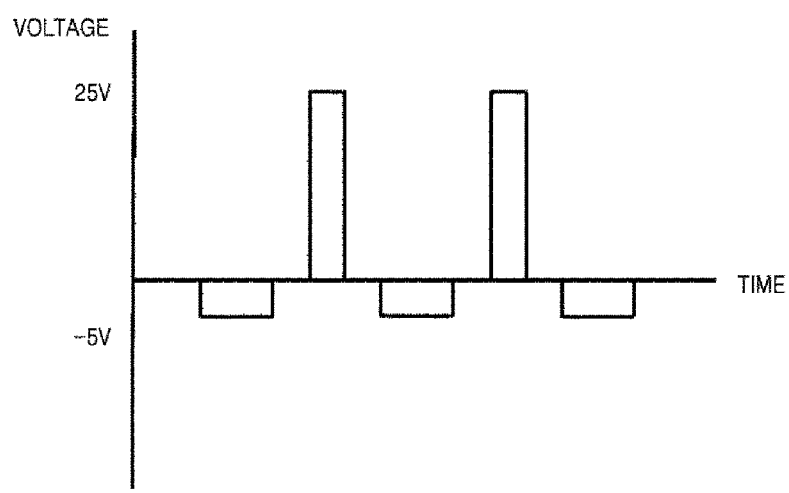
FIGS. 10 to 13 illustrate various patterns of voltages applied to electrodes in experiments, according to embodiments of the present invention.

In the experimental example shown in FIG. 10, when a first driving voltage (+25V) and a second driving voltage (+25V) were applied sequentially, a DC voltage (−5V) having a polarity opposite to that of the first driving voltage was applied to the particles 151 and the fluid 152 as a reset voltage after the first driving voltage was applied but before the second driving voltage was applied.

Figure 11:
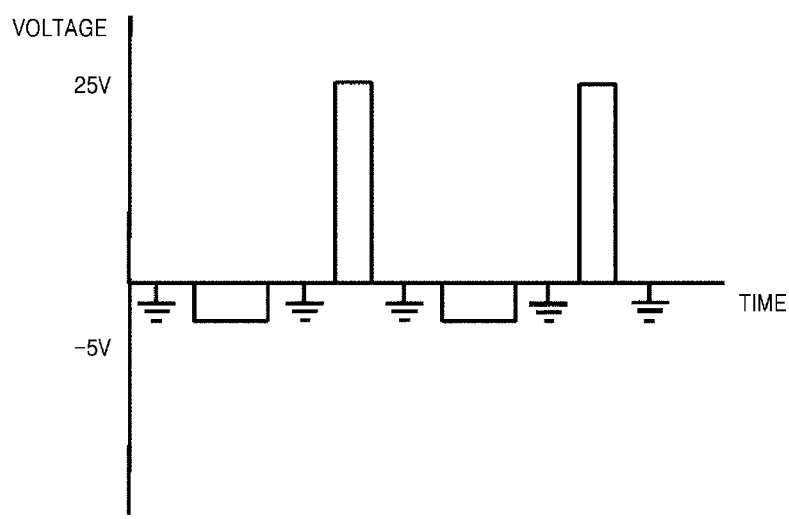

In the experimental example shown in FIG. 11, when a first driving voltage (+25V) and a second driving voltage (+25V) were applied sequentially, a DC voltage (−5V) having a polarity opposite to that of the first driving voltage was applied to the particles 151 and the fluid 152 as a reset voltage after the first driving voltage was applied but before the second driving voltage was applied, and then the upper and lower electrodes 130 and 140 were shorted and discharged.

Figure 12:
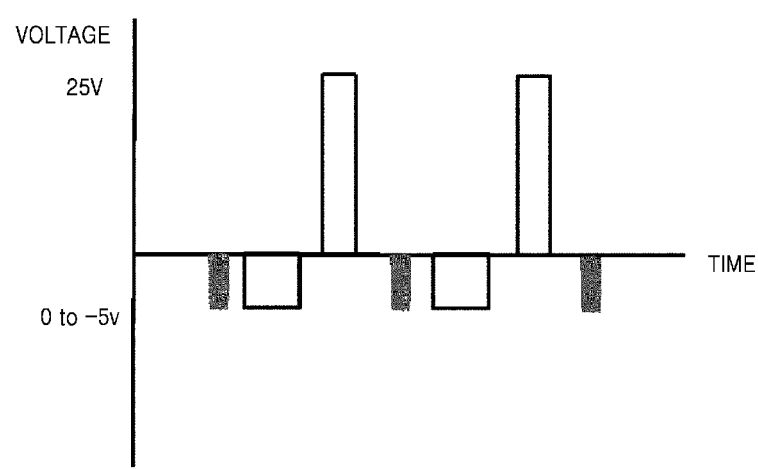

In the experimental example shown in FIG. 12, when a first driving voltage (+25V) and a second driving voltage (+25V) were applied sequentially, a DC voltage (−5V) having a polarity opposite to that of the first driving voltage was applied to the particles 151 and the fluid 152 as a reset voltage after the first driving voltage was applied but before the second driving voltage was applied, and then an AC voltage having a polarity opposite to that of the first driving voltage was applied additionally.

Figure 13:
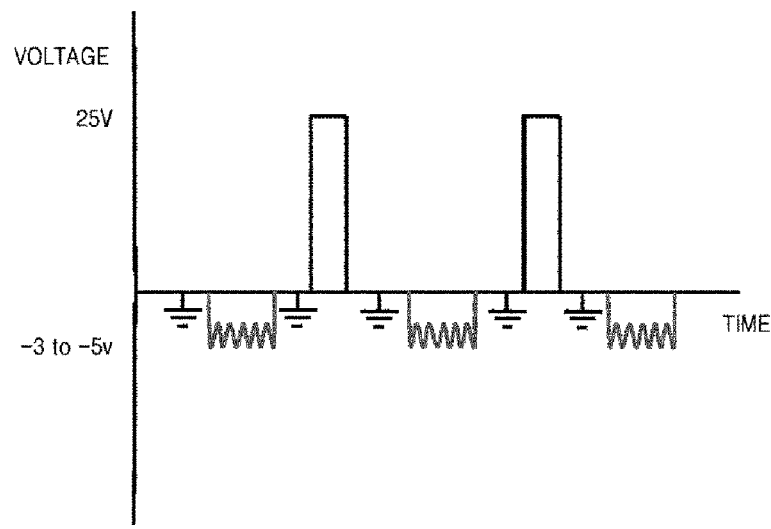
Figure 14:
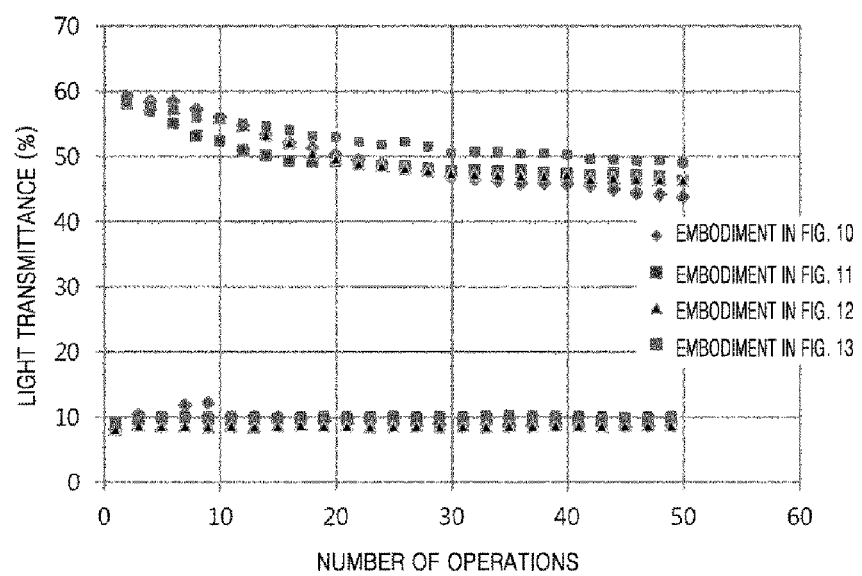
FIG. 14 illustrates the change in light transmittance of a reflective display device as the reflective display device is repeatedly driven in experiments, according to embodiments of the present invention.

In the experimental example shown in FIG. 13, when a first driving voltage (+25V) and a second driving voltage (+25V) were applied sequentially, an AC voltage having a polarity opposite to that of the first driving voltage was applied to the particles 151 and the fluid 152 as a reset voltage after the first driving voltage was applied but before the second driving voltage was applied, and then the upper and lower electrodes 130 and 140 were shorted and discharged.

Referring to FIG. 14, a reduction in light transmittance difference between a light-transmitting state and a light-blocking state (i.e., degradation) due to repeated operation was smaller when an AC voltage having a polarity opposite to that of a driving voltage was applied (FIG. 12) or when the electrodes were shorted and discharged (FIG. 11) than when only a DC voltage having a polarity opposite to that of a driving voltage was applied (FIG. 10). In addition, referring to FIG. 14, the degradation due to repeated operation was smallest when an AC voltage having a polarity opposite to that of a driving voltage was applied and then electrodes were shorted and discharged (FIG. 13).

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation.

Therefore, the scope of the invention is defined not by the detailed description of the invention but by the following claims, and all differences within the scope will be construed as being included in the present invention.

The invention claimed is:

1. A reflective display device comprising: a display part that includes a fluid in which particles having charges are dispersed; an electric field applying unit that includes an upper electrode and a lower electrode for applying an electric field to the display part; and a controller for controlling a color displayed by the display part, by adjusting at least one of intensity, polarity, application time, number of applications, and period of application of a voltage applied to the electric field applying unit, wherein the controller resets an alignment state of the particles by applying a driving voltage for controlling the color displayed by the display part, and then applying an alternating-current (AC) voltage having a polarity opposite to that of the driving voltage, or wherein the controller resets the alignment state of the particles by applying a driving voltage for controlling the color displayed by the display part, and then shorting the electrode; and wherein a first voltage is primarily applied between a third electrode and one of the upper and lower electrodes, which is on the same substrate as the third electrode, to initially spread the particles, and then a second voltage is secondarily applied between the upper electrode and the lower electrode to further spread the particles.

2. The reflective display device of claim 1,
wherein an insulation material is provided on at least a partial region of a surface of the electrode.

3. The reflective display device of claim 1,
wherein the driving voltage is a pulse-type voltage.

4. The reflective display device of claim 1,
wherein the fluid includes an additive capable of improving a degree of dispersion of the particles.

5. A reflective display device comprising: a display part that includes a fluid in which particles having charges are dispersed; an electric field applying unit that includes an upper electrode and a lower electrode for applying an electric field to the display part; and a controller for controlling a color displayed by the display part, by adjusting at least one of intensity, polarity, application time, number of applications, and period of application of a voltage applied to the electric field applying unit, wherein the controller resets an alignment state of the particles by applying a driving voltage for controlling the color displayed by the display part, shorting the electrode, and then applying an alternating-current (AC) voltage having a polarity opposite to that of the driving voltage, and wherein a first voltage is primarily applied between a third electrode and one of the upper and lower electrodes, which is on the same substrate as the third electrode, to initially spread the particles, and then a second voltage is secondarily applied between the upper electrode and the lower electrode to further spread the particles.

6. A reflective display device, comprising:
a display part that includes a fluid in which particles having charges are dispersed;
an electric field applying unit that includes an electrode for applying an electric field to the display part; and
a controller for controlling a color displayed by the display part, by adjusting at least one of intensity, polarity, application time, number of applications, and period of application of a voltage applied to the electric field applying unit, wherein the controller resets an alignment state of the particles by applying a driving voltage for controlling the color displayed by the display part, shorting the electrode, and then applying an alternating-current (AC) voltage having a polarity opposite to that of the driving voltage, and wherein the controller applies a first driving voltage, shorts the electrode, applies an AC voltage having a polarity opposite to that of the first driving voltage, shorts the electrode again, and then applies a second driving voltage.

7. The reflective display device of claim 5, wherein an insulation material is provided on at least a partial region of a surface of the electrode.

8. The reflective display device of claim 5, wherein the driving voltage is a pulse-type voltage.

9. The reflective display device of claim 5, wherein the fluid includes an additive capable of improving a degree of dispersion of the particles.

10. A controlling method of a reflective display device, the method comprising: applying an electric field to a display part that includes a fluid in which particles having charges are dispersed; and controlling a color displayed by the display part, by adjusting at least one of intensity, polarity, application time, number of applications, and period of application of a voltage applied to an upper electrode and a lower electrode for applying the electric field, wherein an alignment state of the particles is reset by applying a driving voltage for controlling the color displayed by the display part, and then applying an alternating-current (AC) voltage having a polarity opposite to that of the driving voltage, or wherein the alignment state of the particles is reset by applying a driving voltage for controlling the color displayed by the display part, and then shorting the electrode, or wherein the alignment state of the particles is reset by applying a driving voltage for controlling the color displayed by the display part, shorting the electrode, and then applying an alternating-current (AC) voltage having a polarity opposite to that of the driving voltage; and wherein a first voltage is primarily applied between a third electrode and one of the upper and lower electrodes, which is on the same substrate as the third electrode, to initially spread the particles, and then a second voltage is secondarily applied between the upper electrode and the lower electrode to further spread the particles.

* * * * *